(12) United States Patent
Waldron

(10) Patent No.: US 7,168,642 B2
(45) Date of Patent: Jan. 30, 2007

(54) GLASS BOTTLE BREAKING APPARATUS

(75) Inventor: Christopher John Waldron, Kingston upon Thames (GB)

(73) Assignee: In-Q-Bator Limited, Twickenham (GB)

( * ) Notice: Subject to any disclaimer, the term of this patent is extended or adjusted under 35 U.S.C. 154(b) by 0 days.

(21) Appl. No.: 10/539,055

(22) PCT Filed: Jan. 22, 2004

(86) PCT No.: PCT/GB2004/000248

§ 371 (c)(1),
(2), (4) Date: Jun. 15, 2005

(87) PCT Pub. No.: WO2004/067179

PCT Pub. Date: Aug. 12, 2004

(65) Prior Publication Data

US 2006/0108461 A1    May 25, 2006

(30) Foreign Application Priority Data

Jan. 30, 2003  (GB) ................................ 0302150.8

(51) Int. Cl.
*B02C 19/00* (2006.01)
(52) U.S. Cl. .................................................. 241/99
(58) Field of Classification Search ............ 241/186.4, 241/101.761, 88.4, 99, 100, 186.2, 33
See application file for complete search history.

(56) References Cited

U.S. PATENT DOCUMENTS 5,073,866 A    12/1991    Daeges
5,186,331 A *  2/1993    Valster .................. 209/3.1
5,328,106 A *  7/1994    Griffin, Jr. ................ 241/99
5,484,109 A *  1/1996    Cook ...................... 241/73
5,944,268 A    8/1999    Andela
6,988,683 B2 * 1/2006    Whettingsteel ............. 241/79

FOREIGN PATENT DOCUMENTS

| DE | 39 18 469 | 12/1990 |
| EP | 0 495 522 | 7/1992 |
| FR | 2 758 097 | 7/1998 |
| GB | 240 263 | 10/1925 |
| GB | 2 053 727 | 2/1981 |

* cited by examiner

*Primary Examiner*—Faye Francis
(74) *Attorney, Agent, or Firm*—Nixon & Vanderhye, P.C.

(57) ABSTRACT

Glass bottle breaking apparatus comprises a hopper (17) for receiving empty glass bottles (47) in bulk, at least a portion of the hopper (17) being formed as a grating including stop means (31), and a shaft (22) located outside of the hopper (17) carrying hammers (43, 44) mounted for pivotal movement relative to the shaft. When the shaft (22) is rotated on its central longitudinal axis by means of a motor (23) and drive (37, 39, 40), the flailing hammers (43, 44) move in an arcuate path into and through the hopper (17) towards and through the stop means (31) and impact with bottles (47) contained within the hopper (17) and lying in the path of the hammers (43, 44) causing breakage of the bottles (47). The apparatus provides for a compact bottle breaking machine with reduced risk of jamming.

10 Claims, 3 Drawing Sheets

GLASS BOTTLE BREAKING APPARATUS

Figure 1:
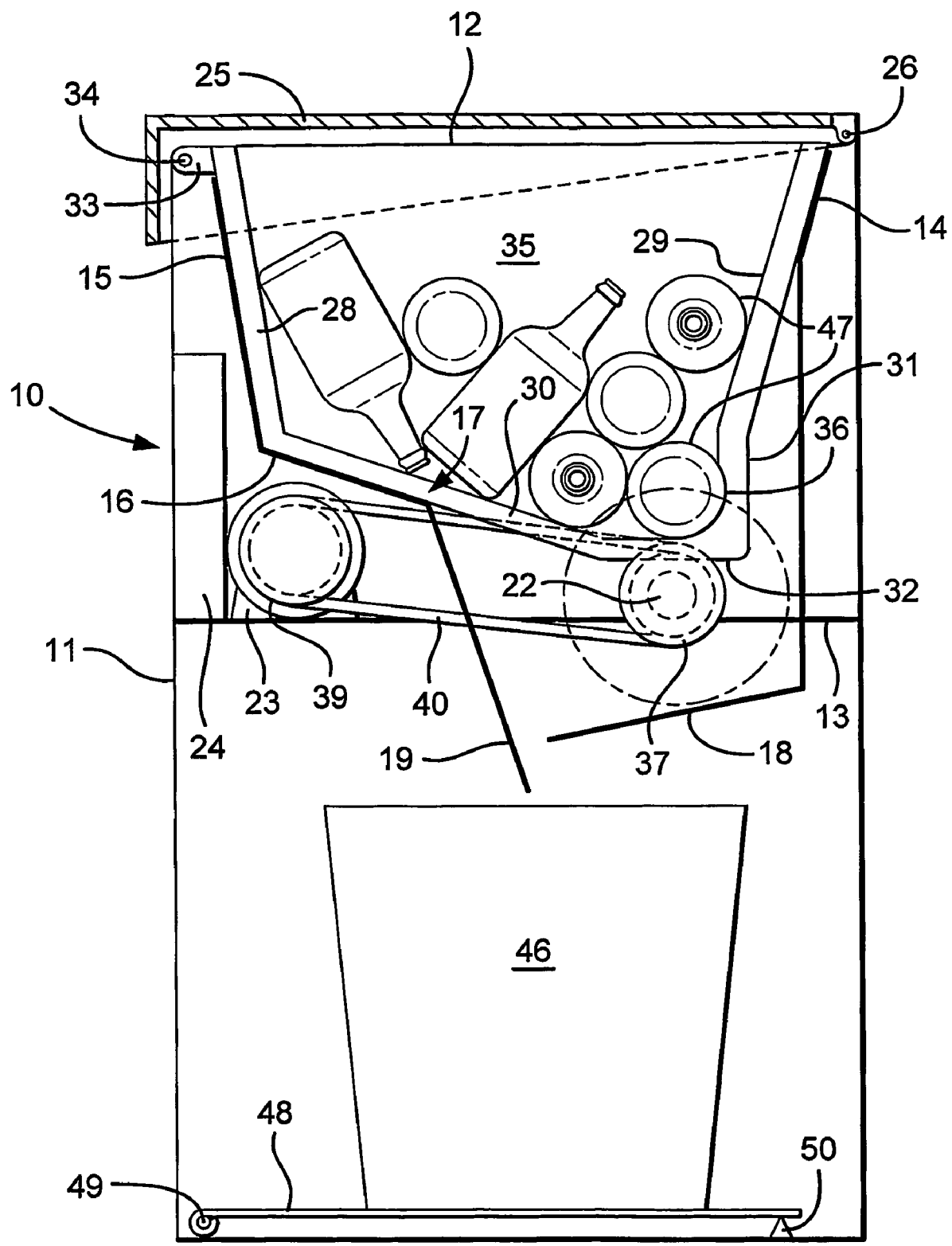

This application is the U.S. national phase of international application PCT/GB2004/000248 filed 22 Jan. 2004 which designated the U.S. and claims benefit of GB 0302150.8, dated 30 Jan. 2003, the entire content of which is hereby incorporated by reference.

This invention relates to glass bottle breaking apparatus.

In EP-A 0 495 522 there is disclosed glass bottle breaking apparatus having a chamber including a grating comprising a plurality of spaced parallel stringers arranged in a first portion adapted to receive bottles and a second portion extending upwardly from the first portion to provide stop means, a shaft carrying a series of bottle breaking means spaced one from another longitudinally of the shaft and drive means for rotating the shaft on a longitudinal axis thereof to cause the breaking means to move in an arcuate path relative to the axis and through corresponding spaces between the stringers so as to break bottles when located in the path.

The shaft extends through the chamber and each breaking means comprises a rigid component which is secured to the shaft and the arcuate path is such that the breaking means move downwardly towards and through the first portion of the grating and effect crushing of bottles located between the breaking means and the first portion of the grating.

The arrangement suffers from a disadvantage in that it is not adapted to receive bottles in bulk. If up to four bottles are simultaneously loaded into the apparatus, it may be that the bottles are crushed, even if they are positioned untidily or haphazardly, but if the batch comprises substantially more bottles, there will be no opportunity for other than four of them to slide under the breaking means and they would back up and cause a blockage resulting in malfunction of the apparatus (so called "jamming").

In a commercial environment, where beverages are dispensed at bars, such apparatus when located at or near a bar for breaking empty bottles collected for disposal would have limited appeal because disposing of the bottles would be time consuming in that only a small number of bottles could be broken in a single batch without causing jamming.

In U.S. Pat. No. 5,944,268 there is disclosed a multi-flail glass pulverizer which comprises a pair of inter-communicating chambers each having a shaft rotatably mounted therein and each shaft carrying a series of hammers spaced one from another longitudinally of thereof and each of the hammers being connected for pivotal movement relative to the corresponding shaft. A first of the chambers is provided with an inlet for receiving empty glass bottles. In operation, the shafts rotate on their longitudinal axes causing the hammers also to rotate and break into glass fragments bottles which are deposited into the inlet and the fragments are swept into an impact zone between the two chambers where the fragments bounce back and forth between the two sets of rotating hammers and thereby become fully comminuted into small particles.

The inlet is funnel shaped, in that it is formed as a narrowing tube, and, in effect, the bottles feed individually through the inlet into the first chamber. Therefore, even if the pulverizer were to be provided with a hopper for receiving bottles in bulk, the flow of bottles would need to be channeled so that they flow successively into the inlet, a confluence which is a common cause of jamming. Apart from being susceptible to jamming and slow because of being a single feed operation, the pulverizer disclosed in U.S. Pat. No. 944,268 is not suitable for use in bars because it is not compact.

In U.S. Pat. No. 6,073,866 there is disclosed apparatus for pulverizing and cleaning brittle recyclable materials, such as glass, which includes a chamber, a shaft located below the chamber carrying a plurality of hammers and drive means for rotating the shaft on a longitudinal axis thereof to cause the hammers to move in an arcuate path relative to the axis so as to effect pulverization of the materials passing between the moving hammers and a stationary plate. The hammers co-operate with the plate in a clipping action.

The clipping action would not provide satisfactory bottle breakage in a "one pass" operation because it is likely that bottles would pass between the hammers and the plate without being completely smashed, there being no means of bottle support adjacent the plate. Indeed, this may not be significant for the purpose for which the apparatus is intended, which is to comminute fragments of material into small particles, because this is achieved mainly by re-cycling material through the apparatus. The fragments could pass many times between the hammers and the plate. The main requirement for such apparatus is not so much speed of bottle breakage but efficient comminuting. Such recycling through the apparatus would be a disadvantage if it were a feature of bottle breaking apparatus for use in bars because it would slow the bottle-breaking throughput. The apparatus disclosed in U.S. Pat. No. 6,073,866 would also be unsuitable for use in bars because it is not compact.

The present invention is characterized in that the chamber is a hopper for receiving bottles in bulk and in that the shaft is located outside of the hopper such that the path of the hammers extends arcuately into and through the hopper and towards and through the stop means so that the hammers impact on bottles located in the path against the stop means.

Therefore, with apparatus in accordance with the present invention, bottles are receivable in the hopper in bulk without interference and constraint and, since the hammers impact on bottles when in the hopper, there is no necessity to channel the bottles and, in consequence, jamming is eliminated or reduced to a minimum. Furthermore, apparatus in accordance with the present invention is compact because the hammers are constrained to effect breakage of bottles within the hopper.

Figure 2:
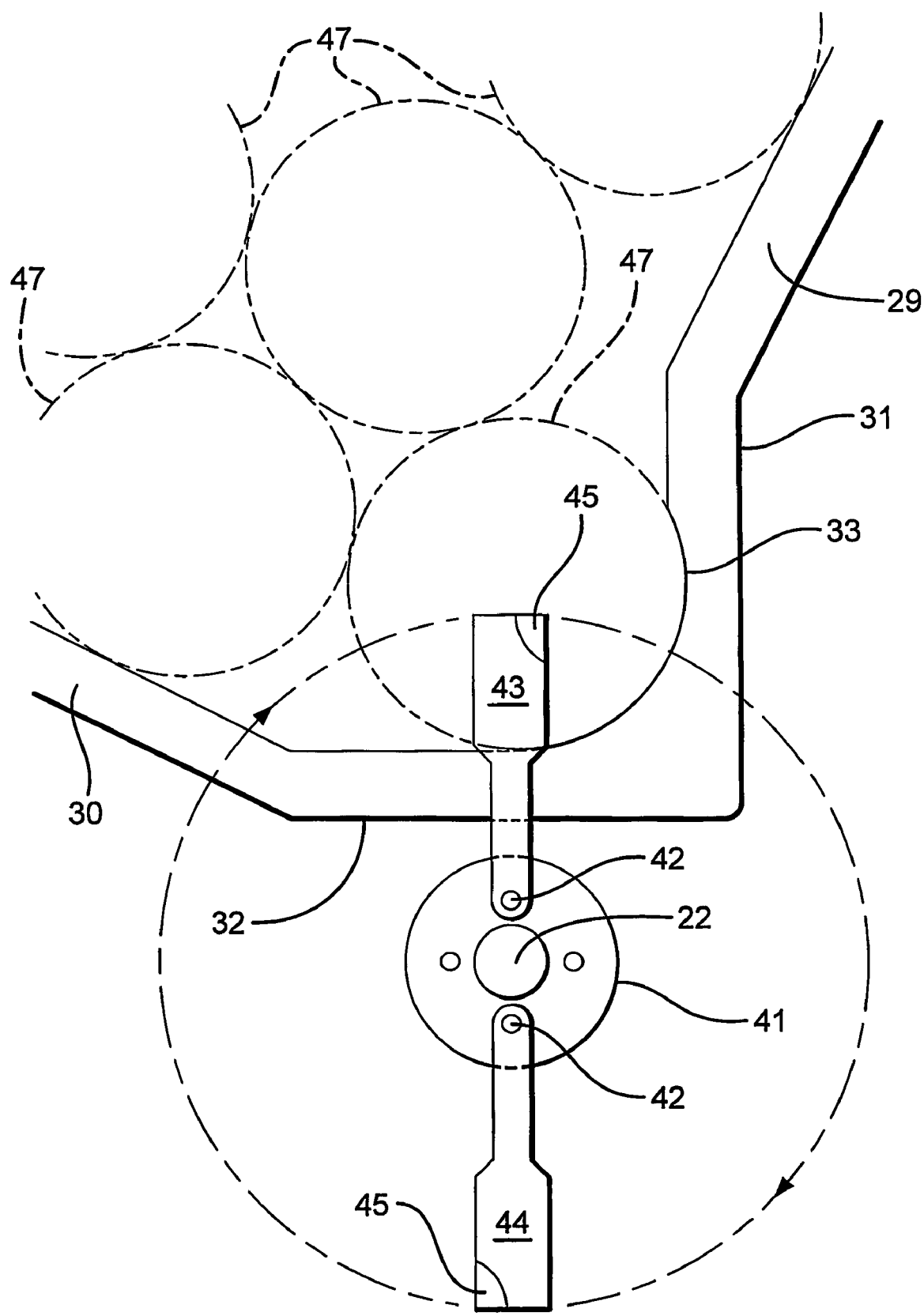
Figure 3:
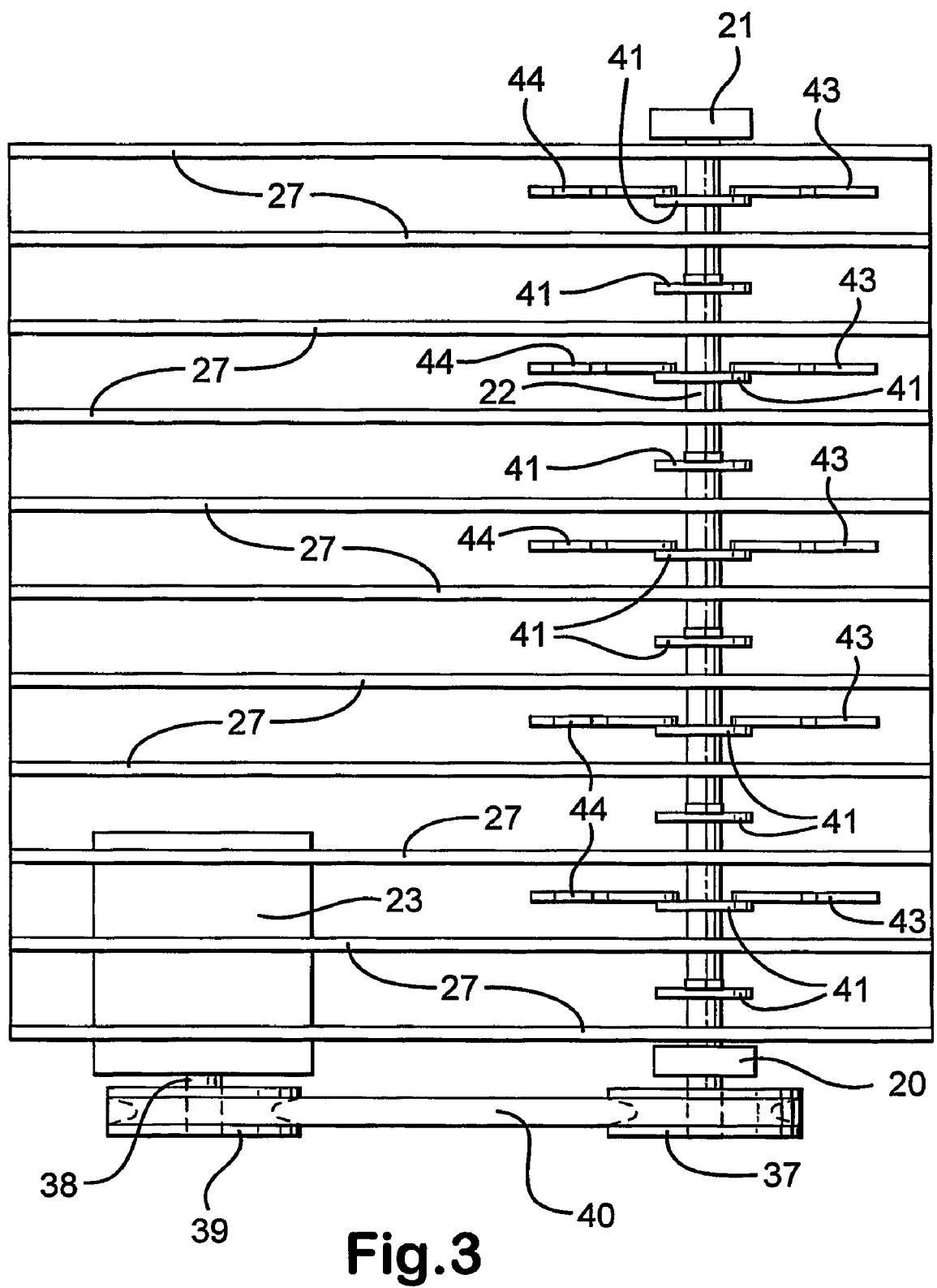

Following is a description, by way of example only and with reference to the accompanying drawings, of one method of carrying the invention into effect In the drawings:

FIG. 1 is a diagrammatic representation of a machine including an embodiment of glass bottle breaking apparatus in accordance with the present invention, FIG. 2 is a diagrammatic representation of part of the apparatus, and FIG. 3 is a diagrammatic plan view of the apparatus.

Referring now to the drawings, there is shown a glass bottle breaking machine 10 comprising a casing 11 having an upper opening 12 and a lower opening (not shown). The casing 11 is attached to a frame 13 and attached to inner surfaces of the casing 11 are inner panels 14 and 15, which provide a receptacle 16 for a hopper 17 and which also provide guides 18, 19. Also mounted on the frame 13 are bearings 20, 21, in which are received opposite ends of a transverse shaft 22, a motor 23 and a housing 24. The upper opening 12 is closed by means of a lid 25, which is hinged to the frame 13, as shown at 26.

The hopper 17 is formed as a basket comprising a plurality of spaced parallel stringers 27 and cross members (not shown). Each of the stringers 27 is of rectangular transverse cross-sectional area and, in elevation as shown in FIG. 1, comprises a front wall portion 28, a rear wall portion 29 and a base portion 30. Each front wall portion 28 slopes downwardly and inwardly to a corresponding base portion 30; each rear wall portion 29 initially slopes downwardly and inwardly and then vertically downwardly, as shown at 31, to the corresponding base portion 30; and each base portion 30 initially slopes downwardly and inwardly from a corresponding front wall portion 28 and then horizontally, as shown at 32, to the vertical component 31 of the corresponding rear wall portion 29. At least the two outermost of the stringers 27 are each provided with upper front wall lugs, one of which is shown at 33, whereby the hopper 17 is pivotally connected to the frame 13, as shown at 34. A spring (not shown) provides a resilient bias urging the hopper 17 in an anti-clockwise direction of the pivot axis 34, when viewed in FIG. 1. The two outermost of the stringers 27 also each have attached thereto on outer surfaces thereof a corresponding one of a pair of side plates, one of which is shown at 35. The vertical and horizontal components 31, 32 of each of the stringers 27 combine to provide a trough having a concave back wall, as shown at 36.

An end portion of the shaft 22 adjacent the motor 23 has secured thereto a pulley 37 and a shaft 38 of the motor 23 has secured thereto a pulley 39. The pulleys 37 and 39 are linked by means of an endless belt 40 whereby rotation of the shaft 22 on a central longitudinal axis thereof is effected by drive from the motor 23 through the shaft 38, the pulley 39, the belt 40 and the pulley 37.

The shaft 22 extends transversely below the hopper 17 and has secured thereto a plurality of discs 41 located co-axially with the central longitudinal axis of the shaft 22 and spaced one from another longitudinally of the shaft 22 at distances corresponding to adjacent spaces between the stringers 27 of the hopper 17. Each of the discs 41 has pivotally connected thereto, as shown at 42, an end portion of each of a pair of elongate hammers 43,44 each having at a tip remote from the shaft 22 an area of reinforcement, as shown at 45. The pivot connections 42 of each pair of hammers 43,44 are diametrically opposed one to another and the axes passing through the pivot connections 42 of adjacent discs 41 are offset by 180 degrees.

The housing 24 contains an electric circuit for controlling the motor 23, the circuit also including switches (not shown).

Prior to operation of the machine 10, a container 46 is inserted in the machine 10 through the lower opening (not shown) and is located below the guides 18 and 19. The lid 25 is then opened and empty glass bottles 47 are deposited into the hopper 17 and the lid 25 is closed. One of the switches of the electric circuit is closed by downward movement of the hopper 17, against the bias of the spring, due to weight of bottles 47 contained in the hopper 17. Another of the switches is closed by closure of the lid 25. The effect of closure of the switches is that, when power is supplied by operation of another of the switches of the electric circuit, the motor 23 operates thereby effecting rotation of the shaft 22 through the pulleys 37 and 39 and the drive belt 40.

In consequence, the hammers 43,44 are swung successively through the hopper 17 in arcuate paths relative to the central longitudinal axis of the shaft 22 and in a clockwise direction, when viewing FIGS. 1 and 2, through spaces between adjacent stringers 27 of the hopper 17 causing breakage of bottles or glass fragments located in the paths of the hammers 43,44. Bottles are thus broken into fragmented pieces of glass and the fragments fall away through spaces between the stringers 27 of the hopper 17. The panels 14 and 15 are arranged such that the guides 18, 19 leave an opening below the hopper 17 and guide the glass fragments into the container 46 where they collect as cullet.

In contrast, if all of the switches are not closed, either because there are no bottles 47 in the hopper 17 to provide sufficient weight to effect switch closure or because the lid 25 has not been closed after bottles 47 have been loaded into the hopper 17, the motor 23 will not become operative. The latter ensures that the lid 25 is in a closed condition during operation of the motor 23 and that glass fragments are not ejected from the machine 10, other than those which are guided by the guides 18 and 19.

The machine 10 may be provided with a plate 48 for supporting the container 46, the plate 48 being pivotally connected at a marginal edge thereof to the frame 13, as shown at 49, and an opposite marginal edge thereof being located on a sensor 50 adapted to generate signals in the electric circuit indicative of loading on the plate 48. The arrangement would be such that the motor 23 would not be mobilized in the event that there is no loading on the plate 48, i.e. if the container 46 were to be absent from the plate 48, and the motor 23 would be immobilized if the weight of cullet in the container 46, when located on the plate 48, exceeded a predetermined magnitude.

The machine 10 thus includes glass bottle breaking apparatus comprising the hopper 17, the shaft 22, the hammers 43,44 and the drive means 23, 38, 39. 40 and 37 for effecting rotation of the shaft 22. The arrangement is such that glass bottles 47 can be received in bulk within the hopper 17 without restriction because, when the shaft 22 is motionless, the hammers 43, 44 depend from the shaft 22 and, therefore, do not extend into the hopper 17. The arrangement is also such that, on entering the hopper 17, the bottles 47 roll down the front wall portions 28 and the sloping components of the base portions 30 of the stringers 27 of the hopper 17 and the leading bottles come to rest against the rear wall portions 29 of the stringers 27, which rear wall portions 29 provide a stop means for the bottles. The stop means provides a reaction against the force of the hammers 43, 44 which move, in their arcuate paths, upwardly into the hopper 17 and towards and through the stop means causing breakage by impact with bottles 47 located in the paths. The effect is enhanced by the vertical and horizontal components 31, 32 of the stringers 27 which reduce any tendency for the bottles 47 to ride up the stop means when subjected to the force of the hammers 43, 44. The effect is further enhanced by the concave profile 36 of the stop means. As the leading bottles 47 are smashed by the hammers 43, 44, they are replaced by trailing bottles 47 which move forwardly towards the stop means, There is thus hardly any possibility of jamming occurring.

The hammers 43, 44 may be formed of steel and the areas 45 of reinforcement may be of hardened steel, these being areas of the hammers 43, 44 which impact with bottles 47.

Although such reinforcement increases the effective period of use of the hammers 43, 44, it may be necessary to replace hammers 43, 44 from time to time. In this regard, instead of being mounted on the frame 13, the bearings 20, 21 for the shaft 22, the motor 23 and the housing 24 may all be mounted on a tray which is slideable under the hopper 17. In the event of breakage of any of the hammers 43,44, or any malfunction of the operating mechanism, the tray may be removed from under the hopper 17 and repair effected.

Also, instead of being attached to inner surfaces of the casing 11, the panels 14, 15 may be attached to the stringers 27 of the hopper 17.

It will be appreciated that a machine incorporating glass bottle breaking apparatus in accordance with the present invention will be of lower overall height, and therefore more compact, than glass bottle breaking machines known hitherto because the sweep of the hammers is within the hopper.

It will also be appreciated that glass bottle breaking apparatus in accordance with the present invention may be supplied separate from a machine casing so that it can be supplied for manufacture of machines of different sizes and specifications. The apparatus may be supplied for use not in a machine but, for example, in ducting extending from a bar to a cellar below.

The invention claimed is:

1. Glass bottle breaking apparatus having a chamber (27 to 32, 35) including a grating (27 to 32) comprising a plurality of spaced parallel stringers (27) arranged in a first portion (32) adapted to receive bottles (47) and a second portion (31) extending upwardly from the first portion (32) to provide stop means (31), a shaft (22) carrying a series of hammers (43, 44) spaced one from another longitudinally of the shaft (22) and each of the hammers (43, 44) being connected for pivotal movement relative to the shaft (22) and drive means (23, 37, 39, 40) for rotating the shaft (22) on a longitudinal axis thereof to cause the hammers (43, 44) to move in an arcuate path relative to the axis and through corresponding spaces between the stringers (27) so as to break bottles (47) when located in the path characterised in that the chamber (27 to 32, 35) is a hopper (17) for receiving bottles (47) in bulk and in that the shaft (22) is located outside of the hopper (17) such that the path of the hammers (43, 44) extends arcuately into and through the hopper (17) and towards and through the stop means (31) so that the hammers (43, 44) impact on bottles (47) located in the path against the stop means (31).

2. Apparatus as claimed in claim 1 characterised in that the first portion (32) extends orthogonally from the stop means (31) in a direction transversely of the apparatus.

3. Apparatus as claimed in claim 1 characterised in that the drive means (23, 37, 39, 40) includes a motor (23) and there is provided control means (24) for controlling operation of the motor (23).

4. Apparatus as claimed in claim 3 characterised in that the hopper (17) includes a cover (25) and the control means (24) includes means for disabling the motor (23) when the cover (25) is not in a position covering the hopper (17).

5. Apparatus as claimed in claim 3 characterised in that the control means (24) includes a sensor (50) for detecting presence of a container (46) for receiving fragments of glass which issue from the hopper (17).

6. Apparatus as claimed in claim 5 characterised in that the control means (24) is adapted to disable the motor (23) when the weight of contents (47) in the container (46) exceeds a predetermined magnitude.

7. Apparatus as claimed in claim 3 characterised in that the control means (24) includes means for disabling the motor (23) unless contents are contained in the hopper (17).

8. Apparatus as claimed in claim 7 characterised in that the hopper (17) is pivotable and the control means (24) includes a switch operable upon pivoting of the hopper (17) so that the drive means (23, 37, 39, 40) is operative only when weight of at least one bottle (47) causes pivotal movement of the hopper (17).

9. Apparatus as claimed in claim 1 characterised in that the shaft (22) is provided with a plurality of discs (41) coaxial with a central longitudinal axis of the shaft (22) and spaced one from another longitudinally of the shaft (22) and in that the hammers (43, 44) are grouped in pairs, each pair being pivotally connected to a corresponding one of the discs (41).

10. Apparatus as claimed in claim 9 characterised in that the hammers (43, 44) of each pair are pivotally connected to a corresponding disc (41) at opposite ends of a diameter of the disc (41) and the diameter is offset by 180 degrees relative to a corresponding diameter of each adjacent disc (41).

\* \* \* \* \*